US011253873B2

(12) United States Patent
Aoki et al.

(10) Patent No.: US 11,253,873 B2
(45) Date of Patent: Feb. 22, 2022

(54) MECHANICAL SEAL FOR CENTRIFUGAL FIELD-FLOW FRACTIONATION DEVICE

(71) Applicant: SHIMADZU CORPORATION, Kyoto (JP)

(72) Inventors: Kengo Aoki, Kyoto (JP); Hiroki Honda, Kyoto (JP); Haruhisa Kato, Tsukuba (JP)

(73) Assignee: SHIMADZU CORPORATION, Kyoto (JP)

( * ) Notice: Subject to any disclaimer, the term of this patent is extended or adjusted under 35 U.S.C. 154(b) by 322 days.

(21) Appl. No.: 16/471,668

(22) PCT Filed: Dec. 18, 2017

(86) PCT No.: PCT/JP2017/045351
§ 371 (c)(1),
(2) Date: Jun. 20, 2019

(87) PCT Pub. No.: WO2018/117031
PCT Pub. Date: Jun. 28, 2018

(65) Prior Publication Data
US 2019/0381519 A1  Dec. 19, 2019

(30) Foreign Application Priority Data

Dec. 22, 2016 (JP) .............................. JP2016-248804

(51) Int. Cl.
B04B 7/00       (2006.01)
B03B 5/32       (2006.01)
(Continued)

(52) U.S. Cl.
CPC .................. B04B 7/00 (2013.01); B03B 5/32 (2013.01); B04B 5/00 (2013.01); B04B 11/02 (2013.01);
(Continued)

(58) Field of Classification Search
CPC .. G01N 1/10; G01N 30/0005; G01N 15/0255; G01N 15/042; G01N 2030/002;
(Continued)

(56) References Cited

U.S. PATENT DOCUMENTS 4,502,699 A * 3/1985 Mukerji ................ B04B 5/0442
                                                      277/398
2014/0066280 A1 * 3/2014 Welz .......................... B04B 9/12
                                                       494/23

FOREIGN PATENT DOCUMENTS

JP     59-216645 A    12/1984
JP     2014-518761 A   8/2014

OTHER PUBLICATIONS

International Search Report for PCT/JP2017/045351 dated Mar. 6, 2018 [PCT/ISA/210].
(Continued)

Primary Examiner — Walter D. Griffin
Assistant Examiner — Shuyi S. Liu
(74) Attorney, Agent, or Firm — Sughrue Mion, PLLC

(57) ABSTRACT

A centrifugal field-flow fractionation device capable of improving analysis performance and shortening analysis time is provided. A first channel 111 communicating with a channel member is formed on a rotational shaft 11 that rotates together with a rotor. A second channel 644 communicating with the first channel 111 is formed on a fixing portion 60 fixed in a state of facing the rotational shaft 11 along a rotational axis L. A mechanical seal 66 having a pair of seal rings 661 and 662 that come into contact with each other and a biasing member 663 is provided to attach one seal ring 661 to the rotational shaft 11 and the other seal ring 662 to the fixing portion 60. The biasing member 663 biases the pair of seal rings 661 and 662 in a direction in which the pair of seal rings come in contact with each other. Since the rotational shaft 11 can be rotated at a high speed and the
(Continued)

liquid sample can be fed at a high pressure, the analysis performance can be improved and the analysis time can be shortened.

5 Claims, 9 Drawing Sheets

(51) Int. Cl.
    *B04B 5/00*          (2006.01)
    *B04B 11/02*        (2006.01)
    *B04B 15/02*        (2006.01)
    *G01N 15/02*       (2006.01)

(52) U.S. Cl.
    CPC ......... *B04B 15/02* (2013.01); *G01N 15/0255* (2013.01); *G01N 2015/0288* (2013.01)

(58) Field of Classification Search
    CPC .... G01N 2015/0288; G01N 2015/0053; B04B 5/00; B04B 5/0442; B04B 7/00; B04B 9/12; B04B 15/02; B04B 11/02; B04B 2005/045; B03B 5/32
    USPC ...................................... 494/23, 41
    See application file for complete search history.

(56) References Cited

OTHER PUBLICATIONS

Written Opinion for PCT/JP2017/045351 dated Mar. 6, 2018 [PCT/ISA/237].

\* cited by examiner

MECHANICAL SEAL FOR CENTRIFUGAL FIELD-FLOW FRACTIONATION DEVICE

TECHNICAL FIELD

The present invention relates to a centrifugal field-flow fractionation device that causes a liquid sample to flow into a channel of a channel member provided in an annular rotor and causes the rotor to rotate so that particles in the liquid sample in the channel are classified by centrifugal force.

BACKGROUND ART

Field flow fractionation has been known as a method for classifying particles contained in a liquid sample according to the size and specific gravity. For example, Patent Document 1 below discloses an example of a centrifugal field-flow fractionation device that classifies particles in a liquid sample by centrifugal force by causing the liquid sample to flow into a channel and rotating the channel.

The centrifugal field-flow fractionation device includes, for example, a rotor and a channel member. The rotor is formed into an annular shape, and is rotatably held about a rotational axis. The channel member has, for example, a three-layer structure, and layers are sequentially laminated in a state where each layer is curved in an arc shape along the inner peripheral surface of the rotor. An arc-shaped channel extending along the inner peripheral surface of the rotor is formed inside the channel member. The channel member is formed with an inlet and an outlet each having a through hole communicating with the channel, so that a liquid sample can flow into the channel through the inlet, and flow out of the channel through the outlet.

In this type of centrifugal field-flow fractionation device, by rotating the rotor, the channel member attached to the rotor can be rotated to apply centrifugal force to the liquid sample in the channel. As a result, particles contained in the liquid sample flowing into the channel from the inlet flow out of the outlet at different timings according to the size and specific gravity. Thus, the particles in the liquid sample are classified according to size and specific gravity.

The rotor is rotatably held by, for example, a hollow rotational shaft, and the inlet and the outlet communicate with the rotational shaft via a pipe. The liquid sample is, for example, supplied into the rotational shaft from one end of the rotational shaft, and classified by being introduced into the channel of the channel member from the inlet through the pipe, and then is introduced into the rotational shaft from the outlet via the pipe.

PRIOR ART DOCUMENT

Patent Document

Patent Document 1: Japanese Translation of PCT International Application Publication No. JP-T-2014-518761

SUMMARY OF THE INVENTION

Problems to be Solved by the Invention

In order to prevent the liquid sample from leaking from the rotational shaft, conventionally, an oil seal that is in sliding contact with the outer peripheral surface of the rotational shaft has been used. For example, in Patent Document 1, the first seal rings 38a and 38b and the second seal rings 36a and 36b are used as oil seals. The oil seal is provided in close contact with the outer peripheral surface of the rotational shaft. When the rotational shaft is rotating, the outer peripheral surface of the rotational shaft and the oil seal are brought into sliding contact with each other while maintaining a close contact state, whereby leakage of the liquid sample from between the outer peripheral surface and the oil seal can be prevented. However, the structure using such an oil seal has the following problems.

First, the liquid sample cannot be fed at a high pressure. Specifically, when the pressure of the liquid sample fed into the channel member is high, the pressure of the liquid sample passing through the vicinity of the oil seal is also high, and thus the oil seal may be deformed by the pressure. In this case, the liquid sample leaks out from a gap generated by the deformation of the oil seal, or heat is generated by pressing the oil seal strongly against the rotational shaft.

When the rotational shaft is rotated at a high speed, it is necessary to increase the outer diameter of the rotational shaft or to form the rotational shaft with a material having a high strength in order to increase the strength of the rotational shaft. When the outer diameter of the rotational shaft is increased, the peripheral speed (m/s) of the portion in sliding contact with the oil seal is increased, and therefore, heat is easily generated between the oil seal and the rotational shaft.

As described above, in the structure using the oil seal in sliding contact with the outer peripheral surface of the rotational shaft, it is difficult to rotate the rotational shaft at a high speed and feed the liquid sample at a high pressure. On the other hand, the analysis performance is higher when the rotational shaft is rotated at a high speed, and the analysis time is shorter when the liquid sample is fed at a high pressure. Therefore, the conventional structure using the oil seal has a limit in improving the analysis performance and shortening the analysis time.

The oil seal is usually made of a resin material. When the oil seal is used in a high-temperature environment, the oil seal may melt depending on the pressure of the liquid feed of the liquid sample and the rotational speed of the rotational shaft. In order to prevent this, it is necessary to monitor the temperature and pressure of cooling while cooling the oil seal, by separately providing a cooling mechanism or a temperature and pressure monitoring mechanism.

Further, depending on the component of the liquid sample to be fed into the channel member, the material of the oil seal may be affected. Therefore, the liquid sample to be used is limited to the one which does not affect the material of the oil seal.

When the oil seal melts at a high temperature or is affected by components of the liquid sample, the liquid sample may leak due to deterioration of the oil seal.

The present invention has been made in view of the above circumstances, and it is an object of the present invention to provide a centrifugal field-flow fractionation device which can improve the analysis performance and shorten the analysis time. It is another object of the present invention to provide a centrifugal field-flow fractionation device capable of preventing a liquid sample from leaking under the influence of a temperature environment or components of the liquid sample.

Means for Solving the Problems (1) A centrifugal field-flow fractionation device according to the present invention includes an annular rotor, a channel member, a rotational shaft, a fixing portion, and a mechanical seal. The rotor rotates about a rotational axis. The channel member is provided in the rotor, and has therein a channel for a liquid sample extending in an arc shape around the rotational axis, an inlet for the liquid sample to the channel, and an outlet for the liquid sample from the channel. The rotational shaft rotates with the rotor, and has a first channel in communication with the inlet or the outlet along the rotational axis. The fixing portion is fixed in a state of facing the rotational shaft along the rotational axis, and has a second channel in communication with the first channel along the rotational axis. The mechanical seal has a pair of seal rings in contact with each other and a biasing member, one of the pair of seal rings is attached to the rotational shaft, the other of the pair of seal ring is attached to the fixing portion, and the biasing member biases the pair of seal rings in a direction in which the pair of seal rings come into contact with each other.

According to such a configuration, the first channel formed on the rotational shaft and the second channel formed on the fixing portion are fluid-tightly connected via the mechanical seal. That is, of the pair of seal rings provided in the mechanical seal, one seal ring is attached to the rotational shaft and the other seal ring is attached to the fixing portion, and the pair of seal rings are brought into contact with each other by the biasing force of the biasing member. When the rotational shaft is rotated, the pair of seal rings are brought into sliding contact with each other while being in contact with each other, so that the first channel and the second channel are maintained in a liquid-tight state.

In the configuration using such a mechanical seal, even when the rotational shaft is rotated at a high speed, heat generation is less likely to occur as compared with the configuration in which the oil seal is brought into sliding contact with the outer peripheral surface of the rotational shaft. Further, even when the liquid sample is fed to the first channel and the second channel at a high pressure, the possibility of leakage of the liquid sample due to deformation or generation of heat is lower than in the case of an oil seal. Therefore, since the rotational shaft can be rotated at a high speed and the liquid sample can be fed at a high pressure, the analysis performance can be improved and the analysis time can be shortened.

Further, since the pair of seal rings constituting the mechanical seal are formed of a material having high heat resistance and reactivity resistance such as a metal, it is possible to prevent each seal ring from melting by being used in a high-temperature environment and to prevent each seal ring from being affected by the components of the liquid sample. Therefore, the liquid sample can be prevented from leaking under the influence of the temperature environment or the components of the liquid sample.

(2) A cooling liquid supply port for supplying a cooling liquid for cooling the mechanical seal may be formed in the fixing portion.

According to this configuration, the mechanical seal is cooled by the cooling liquid supplied from the cooling liquid supply port provided in the fixing portion. By forming the cooling liquid supply port in the fixing portion instead of the rotational shaft, it is possible to prevent the pipe for supplying the cooling liquid to the cooling liquid supply port from being entangled with the rotation of the rotational shaft.

(3) The cooling liquid supply port may supply the cooling liquid to the mechanical seal from above. In this case, a drain port for discharging the cooling liquid to the outside of the fixing portion may be formed below the mechanical seal in the fixing portion.

According to such a configuration, the cooling liquid supplied from the cooling liquid supply port is guided by gravity to a mechanical seal provided below the cooling liquid supply port, and the mechanical seal is cooled. The cooling liquid after the mechanical seal is cooled is guided by gravity to a drain port formed below the mechanical seal in the fixing portion, and is discharged from the drain port to the outside of the fixing portion. Thus, the mechanical seal can be well cooled by simply supplying the cooling liquid to a simple channel utilizing gravity.

(4) By providing a plurality of ribs above the mechanical seal in the fixing portion, a labyrinth structure may be formed to prevent leakage of cooling liquid from the gap between the fixing portion and the rotational shaft.

According to such a configuration, leakage of the cooling liquid from the gap between the fixing portion and the rotational shaft to the outside can be prevented by the labyrinth structure, and the cooling liquid can be well discharged from the drain port. Thus, it is possible to prevent the cooling liquid from scattering to the outside of the device.

(5) At least one of the rotational shaft and the fixing portion may be formed with a branch path branched from a connection portion between the first channel and the second channel. In this case, the pair of seal rings may be biased in a direction in which the pair of seal rings come into contact with each other by a pressure received from a liquid sample flowing into the branch path.

According to such a configuration, the pair of seal rings come into contact with each other with a larger biasing force by the pressure received from the liquid sample flowing into the branch path, so that the first channel and the second channel are maintained in a higher liquid-tight state.

(6) The centrifugal field-flow fractionation device may further include a first pipe and a second pipe. The first pipe is provided in the rotational shaft along the rotational axis and constitutes at least a part of the first channel. The second pipe is provided in the fixing portion along the rotational axis and constitutes at least a part of the second channel. The tips of the first pipe and the second pipe face each other in close proximity to each other at a position shifted toward the rotational shaft with respect to the a contact position of the pair of seal rings.

According to such a configuration, since the liquid sample flows in the first pipe or the second pipe at the contact position of the pair of seal rings, even when the pair of seal rings are in sliding contact with each other at the contact position, it is possible to prevent the liquid sample from being stirred at the contact position. Thus, for example, when the liquid sample after the particles have been classified passes through the contact position of the pair of seal rings, the classified particles can be prevented from being mixed at the contact position, thereby improving the classification performance. Even when a foreign matter is generated at the contact position of a pair of seal rings that are in sliding contact with each other, the foreign matter is difficult to enter the first channel or the second channel, so that deterioration of the analysis performance can be suppressed.

The tips of the first pipe and the second pipe may face each other in close proximity to each other at a position shifted toward the fixing portion with respect to the a contact position of the pair of seal rings. Alternatively, the first pipe may not be provided, and the tip end of the second pipe may be disposed at a position shifted toward the rotational shaft with respect to a contact position of the pair of seal rings.

Effects of the Invention

According to the present invention, since the rotational shaft can be rotated at a high speed and the liquid sample can be fed at a high pressure, the analysis performance can be improved and the analysis time can be shortened. Further, according to the present invention, since it is possible to prevent the seal rings from melting by being used in a high-temperature environment and to prevent the seal rings from being affected by the components of the liquid sample, it is possible to prevent the liquid sample from leaking under the influence of the temperature environment or the components of the liquid sample.

MODE FOR CARRYING OUT THE INVENTION

1. Analysis System Configuration

Figure 1:
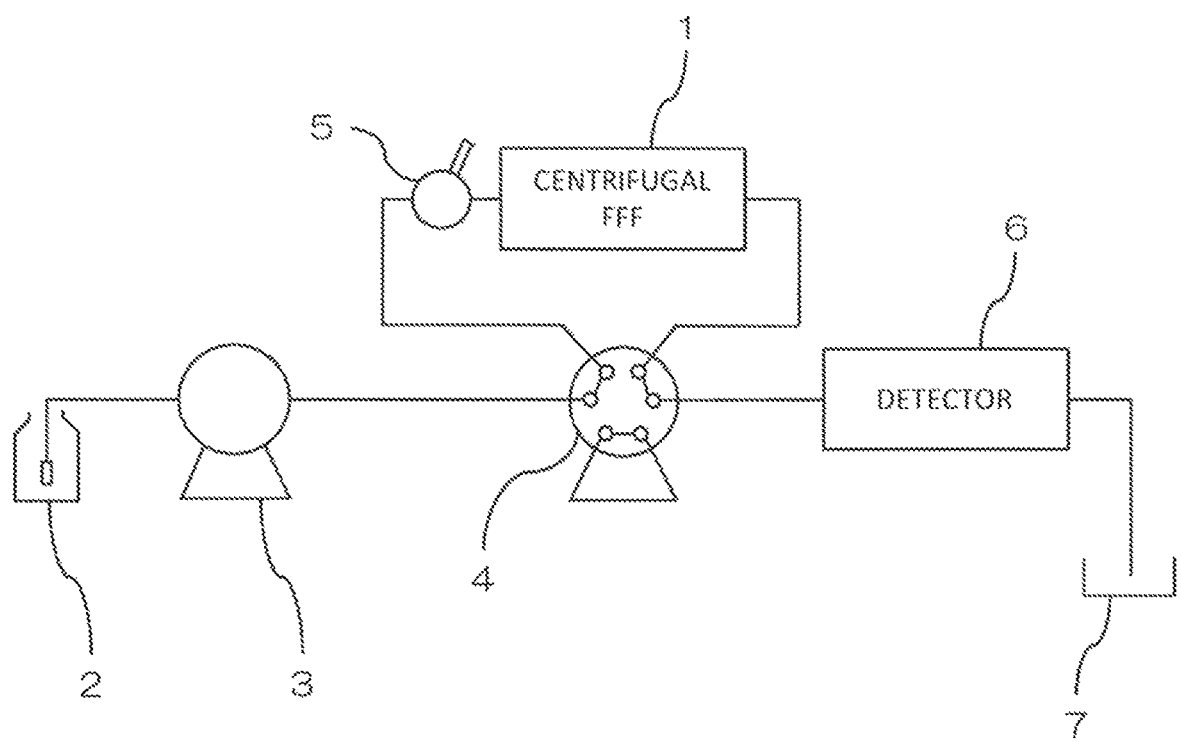
FIG. 1 is a schematic view showing a configuration example of an analysis system provided with a centrifugal field-flow fractionation device according to an embodiment of the present invention.

FIG. 1 is a schematic view showing a configuration example of an analysis system provided with a centrifugal field-flow fractionation device 1 according to an embodiment of the present invention. The centrifugal field-flow fractionation device 1 classifies particles contained in a liquid sample according to their size and specific gravity by using field flow fractionation. The analysis system shown in FIG. 1 includes a carrier storage unit 2, a liquid feed pump 3, a rotary valve 4, a sample injection device 5, a detector 6, and a carrier collection unit 7, in addition to the centrifugal field-flow fractionation device 1.

The carrier storage unit 2 stores a carrier fluid made of, for example, water or an organic solvent. The carrier fluid is fed from the carrier storage unit 2 by the liquid feed pump 3, and is supplied to the centrifugal field-flow fractionation device 1 via the rotary valve 4. The sample injection device 5 is provided between the rotary valve 4 and the centrifugal field-flow fractionation device 1, and the carrier fluid injected with the sample from the sample injection device 5 is supplied to the centrifugal field-flow fractionation device 1 as a liquid sample.

The liquid sample contains a large number of particles to be analyzed. The particles contained in the liquid sample are classified by centrifugal force in the centrifugal field-flow fractionation device 1, and are discharged from the centrifugal field-flow fractionation device 1 at different timings according to the size and specific gravity. The particles flowing out sequentially from the centrifugal field-flow fractionation device 1 are sent to the detector 6 together with the carrier fluid via the rotary valve 4, and after being detected by the detector 6, they are collected by the carrier collection unit 7. The start or stop of the supply of the liquid sample to the centrifugal field-flow fractionation device 1 can be switched by rotating the rotary valve 4.

2. Configuration of Centrifugal Field-Flow Fractionation Device

Figure 2:
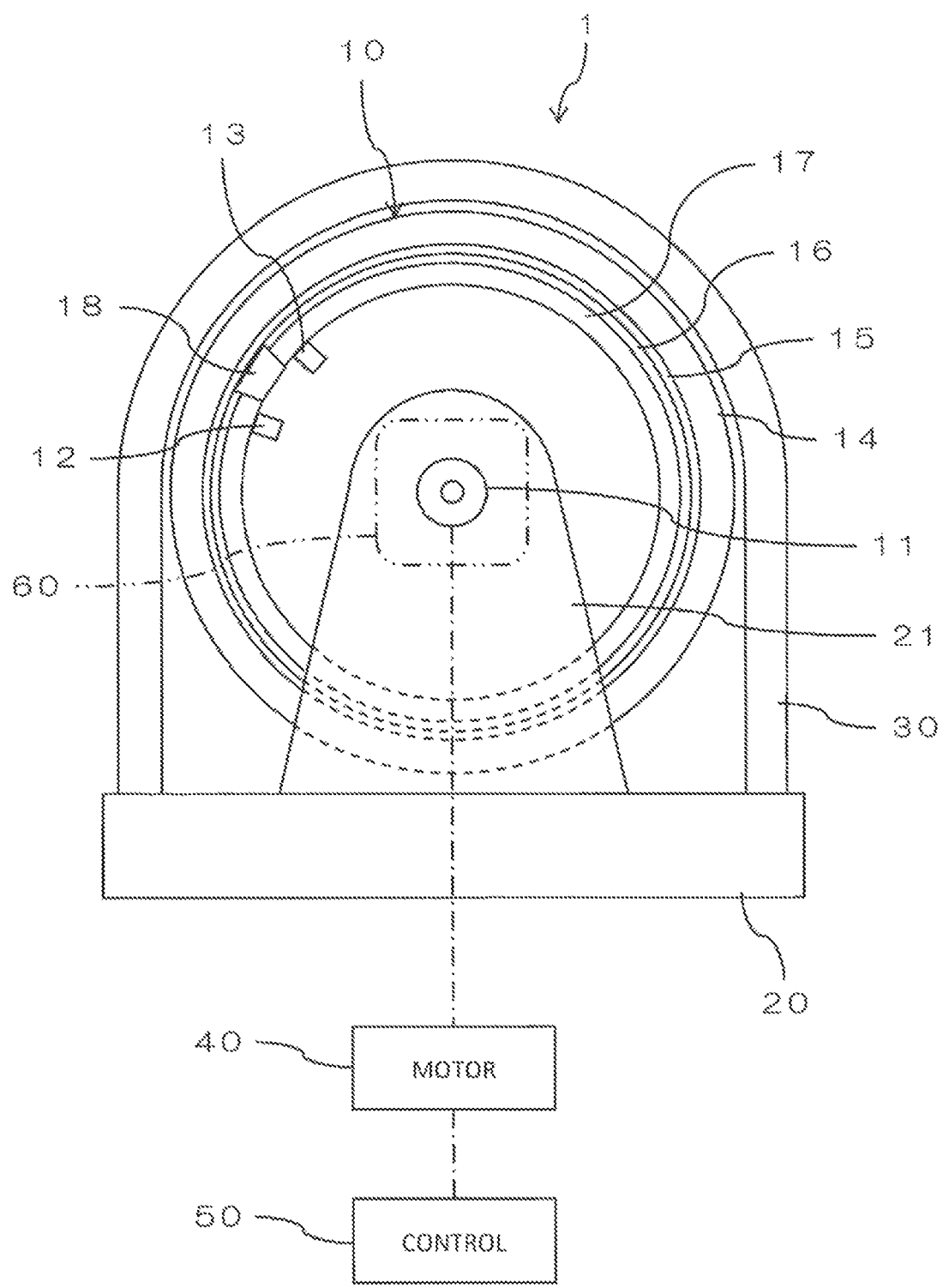
FIG. 2 is a schematic front view showing a configuration example of the centrifugal field-flow fractionation device.

FIG. 2 is a schematic front view showing a configuration example of the centrifugal field-flow fractionation device 1. The centrifugal field-flow fractionation device 1 is constituted by assembling a rotation unit 10 that rotates about a rotational shaft 11, a holding table 20 that rotatably holds the rotational shaft 11, and a protective wall 30 that prevents an operator from contacting the rotation unit 10.

The rotation unit 10 is formed in a cylindrical shape, for example, and is held by the holding table 20 so that the rotational shaft 11 attached to the center portion thereof extends horizontally. A pair of holding plates 21 extending in the vertical direction are provided in parallel at an interval with each other on the holding table 20. The rotation unit 10 is disposed between the pair of holding plates 21, and the rotational shaft 11 is rotatably held by the holding plates 21. A fixing portion 60 is fixed to the holding plate 21 from the outside (opposite side of the rotation unit 10 side), and the end face of the rotational shaft 11 is covered with the fixing portion 60. The protective wall 30 is, for example, a U-shaped member curved in a shape corresponding to the outer peripheral surface of the rotation unit 10, and is mounted on the holding table 20 in a state of facing each other across a small interval with respect to the outer peripheral surface so as to cover the outer peripheral surface of the rotation unit 10.

The rotational shaft 11 is formed in a hollow shape, and a liquid sample is supplied into the rotational shaft 11 from, for example, one end of the rotational shaft 11. The rotation unit 10 is provided with an introduction unit 12 into which the liquid sample before classification is introduced, and a discharge unit 13 from which the liquid sample after classification is discharged. The introduction unit 12 and the discharge unit 13 communicate with each other into the rotational shaft 11 via a pipe (not shown). Thus, the liquid sample supplied into the rotational shaft 11 is introduced into the rotation unit 10 from the introduction unit 12 via the pipe, and after the particles in the sample liquid are classified in the rotation unit 10, the liquid sample is guided to the rotational shaft 11 via the pipe from the discharge unit 13 and sent to the detector 6.

A motor 40, which is an example of a rotation drive unit, is connected to the rotational shaft 11. By driving the motor 40, the rotation unit 10 is rotated to apply a centrifugal force to the liquid sample in the rotation unit 10. The driving of the motor 40 is controlled by a control unit 50 including, for example, a CPU (Central Processing Unit). However, the rotation unit 10 can also be rotated by using a rotation drive unit other than the motor 40.

3. Configuration of Rotation Unit

Figure 3:
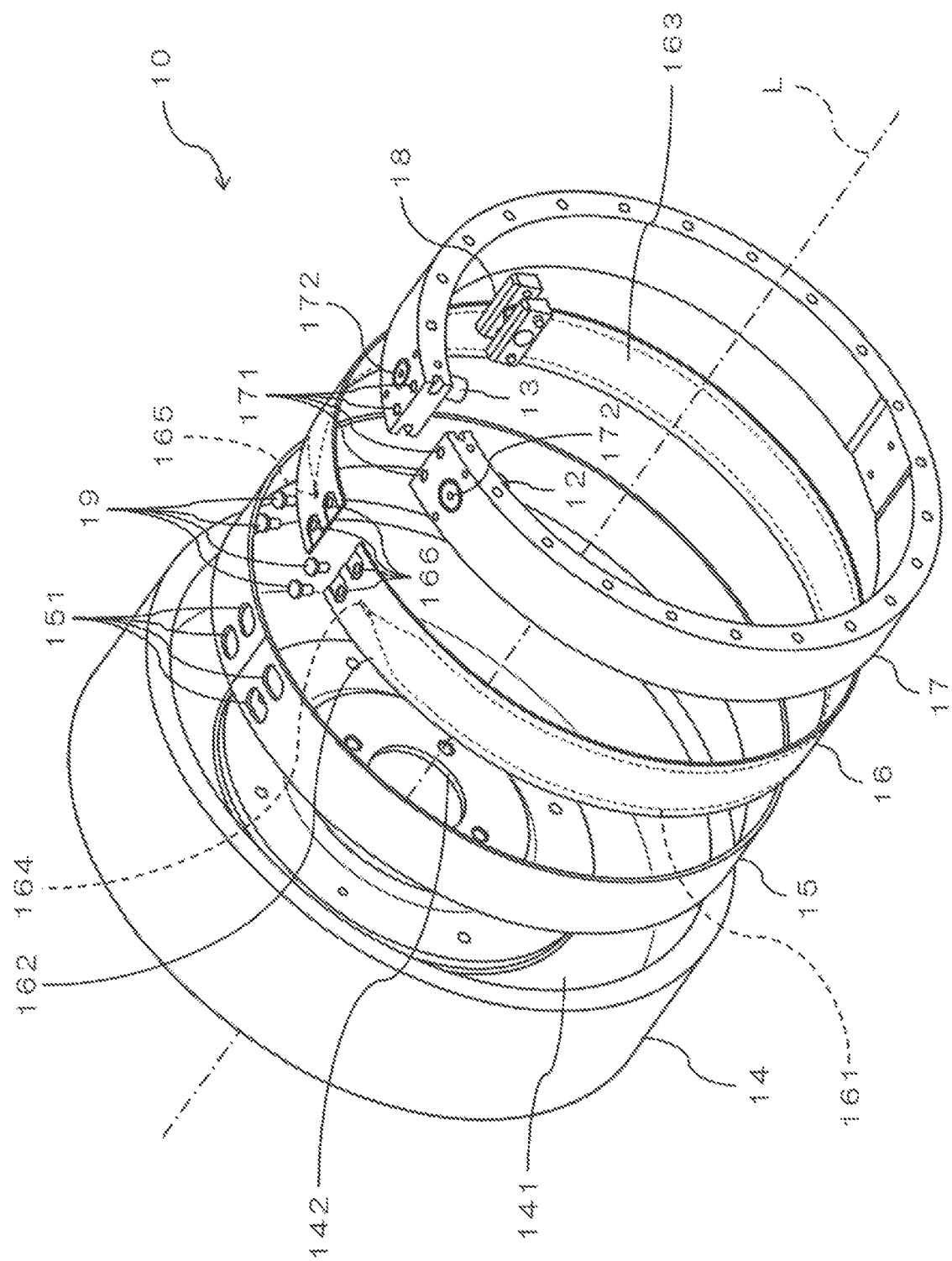
FIG. 3 is an exploded perspective view showing a configuration example of a rotation unit.

FIG. 3 is an exploded perspective view showing a configuration example of the rotation unit 10. The rotation unit 10 is configured as a cylindrical member as a whole by assembling, for example, a rotor 14, a spacer 15, a channel member 16, a fixing member 17, a wedge-shaped member 18, and the like.

The rotor 14 is an annular member, and one end face thereof is closed by an end face wall 141. The end face wall 141 is formed in a disk shape, and has an insertion hole 142 for receiving the rotational shaft 11 in the central portion thereof. By inserting the rotational shaft 11 into the insertion hole 142 and fixing it to the end face wall 141, the rotor 14 can be rotated about a rotational axis L coaxial with the rotational shaft 11 as the rotational shaft 11 rotates.

The spacer 15, the channel member 16, the fixing member 17, and the wedge-shaped member 18 are accommodated in a space inside (the rotational axis L side) the rotor 14. Each of the spacer 15, the channel member 16, and the fixing member 17 has a shape in which an elongated member is curved in an arc shape, and is fixed along the inner peripheral surface of the rotor 14 in a state of being laminated in this order. The radii of curvature of the spacer 15, the channel member 16, and the fixing member 17 are, for example, about 50 to 200 mm.

The channel member 16 is, for example, a thin plate with a thickness of 1 mm or less, and is formed into a C shape by both end portions in the circumferential direction facing each other across an interval. A channel 161 extending in the circumferential direction is formed in the channel member 16. That is, the channel member 16 has an arc-shaped outer peripheral surface 162 formed on the rotor 14 side and an arc-shaped inner peripheral surface 163 formed on the rotational axis L side, and the channel 161 is formed between the outer peripheral surface 162 and the inner peripheral surface 163.

An inlet 164 for the liquid sample to the channel 161 is formed at one circumferential end of the inner peripheral surface 163 of the channel member 16. On the other hand, an outlet 165 for the liquid sample from the channel 161 is formed at the other circumferential end of the inner peripheral surface 163 of the channel member 16. Accordingly, the liquid sample flowing into the channel 161 from the inlet 164 flows in the channel 161 along the circumferential direction from one end to the other end, and flows out from the outlet 165.

When the particles in the liquid sample are classified, first, the rotation unit 10 is rotated by driving of the motor 40, and the rotational speed of the rotation unit 10 is gradually increased. When the rotational speed of the rotation unit 10 reaches a certain value (for example, 5000 rpm), the liquid sample is injected from the inlet 164 while the rotational speed is maintained.

After the liquid sample is injected into the channel 161 for a certain period of time, the supply of the liquid sample is stopped by switching of the rotary valve 4, and the rotation unit 10 is rotated as it is. Consequently, the particles in the liquid sample in the channel 161 are centrifugally precipitated. Thereafter, the supply of the liquid sample is resumed by the switching of the rotary valve 4, and the rotational speed of the rotation unit 10 is gradually lowered after a predetermined period of time.

As a result, particles, in ascending order of size and specific gravity in the liquid sample, are sequentially sent downstream along the flow of the liquid sample in the channel 161, and flow out sequentially from the outlet 165. In this way, the particles in the liquid sample in the channel 161 are classified by centrifugal force, flow out from the outlet 165 at different timings according to the size and specific gravity, and are sent to the detector 6.

The fixing member 17 is a member having a thickness larger than that of the channel member 16, and is formed to have a thickness of about 10 mm, for example. Similar to the channel member 16, the fixing member 17 is formed into a C-shape by the both circumferential end portions facing each other across an interval. The circumferential length of the fixing member 17 is substantially the same as the circumferential length of the channel member 16. The fixing member 17 is provided inside (the rotational axis L side) the channel member 16 along the inner peripheral surface 163 of the channel member 16.

A plurality of screw holes 171 for receiving a bolt 19, which is an example of a locking tool, are formed at both circumferential end portions of the fixing member 17. A plurality of insertion holes 166 are formed at both circumferential end portions of the channel member 16 at positions facing the respective screw holes 171 of the fixing member 17. Thus, the bolt 19 is inserted into each of the insertion holes 166 from the outside and screwed into each of the screw holes 171. Thus, the channel member 16 can be attached to the fixing member 17. However, the locking tool is not limited to the bolt 19, and may be constituted by another member such as a pin.

Through holes 172 are formed at respective circumferential end portions of the fixing member 17 at positions facing the inlet 164 and the outlet 165 that are formed on the inner peripheral surface 163 of the channel member 16. The introduction unit 12 and the discharge unit 13 are attached to the inner peripheral surface of the fixing member 17 so as to communicate with the respective through holes 172. As a result, the liquid sample introduced from the introduction unit 12 flows into the channel 161 from the inlet 164 via one of the through holes 172, flows in the channel 161 in the circumferential direction, and then is discharged from the outlet 165 via the other through hole 172 and the discharge unit 13.

The channel 161 in the channel member 16 is set to a different height depending on the type of the carrier fluid, the condition of the analysis, and the like. Therefore, the channel member 16 is formed to have a different thickness in accordance with the height of the channel 161, and an optimum channel member 16 is selected from a plurality of types of channel member 16 and attached to the fixing member 17.

The fixing member 17 to which the channel member 16 is attached as described above is inserted into a space inside the rotor 14 and fixed along the inner peripheral surface of the rotor 14 so as to sandwich the channel member 16 between the rotor 14 and the fixing member 17. At this time, by attaching the wedge-shaped member 18 between both end portions of the C-shaped fixing member 17, a force is applied in a direction in which the both end portions are expanded.

As a result, the C-shaped fixing member 17 is strongly pressed against the inner peripheral surface side of the rotor 14, and the channel member 16 is pressed against and fixed to the rotor 14 side. When the particles in the liquid sample are classified, the inside of the channel 161 becomes high pressure (for example, about 1 MPa) due to the high-speed rotation of the rotor 14, and the pressure difference between the inside and the outside of the channel 161 increases. However, by sandwiching the channel member 16 between the fixing member 17 and the rotor 14, the outer peripheral surface 162 and the inner peripheral surface 163 of the channel member 16 can be prevented from being deformed to the side opposite to the channel 161 side by the pressure difference.

In this embodiment, the spacer 15 is sandwiched between the channel member 16 and the rotor 14. The material of the spacer 15 is not particularly limited, but is formed of, for example, a resin such as PET (Polyethylene Terephthalate)

or metal. The spacer 15 is formed to be slightly longer than the channel member 16, and long holes 151 are formed at both circumferential end portions of the spacer 15 at positions facing the respective insertion holes 166 of the channel member 16.

The head of the bolt 19 inserted into each of the insertion holes 166 of the channel member 16 is accommodated in each of the long holes 151 of the spacer 15. Each of the long holes 151 is formed to extend in the circumferential direction. Thus, when both end portions of the fixing member 17 are expanded by the wedge-shaped member 18 and the fixing member 17 is strongly pressed against the inner peripheral surface side of the rotor 14 while the head of each of the bolts 19 is accommodated in the respective long holes 151, the spacer 15 and the channel member 16 are sandwiched between the fixing member 17 and the rotor 14 while the head of each of the bolts 19 slides in the circumferential direction in the respective long holes 151.

The spacer 15 is, for example, a thin plate with a thickness of 1 mm or less, and a spacer with a different thickness according to the thickness of the channel member 16 is selected. That is, the spacer 15 having the optimum thickness is selected so that the total value of the thickness of the spacer 15 and the thickness of the channel member 16 is substantially constant. The spacer 15 also has a function of preventing damage to the inner peripheral surface of the rotor 14. However, the spacer 15 can be omitted.

4. Configuration of Rotational Shaft and Fixing Portion

Figure 4:
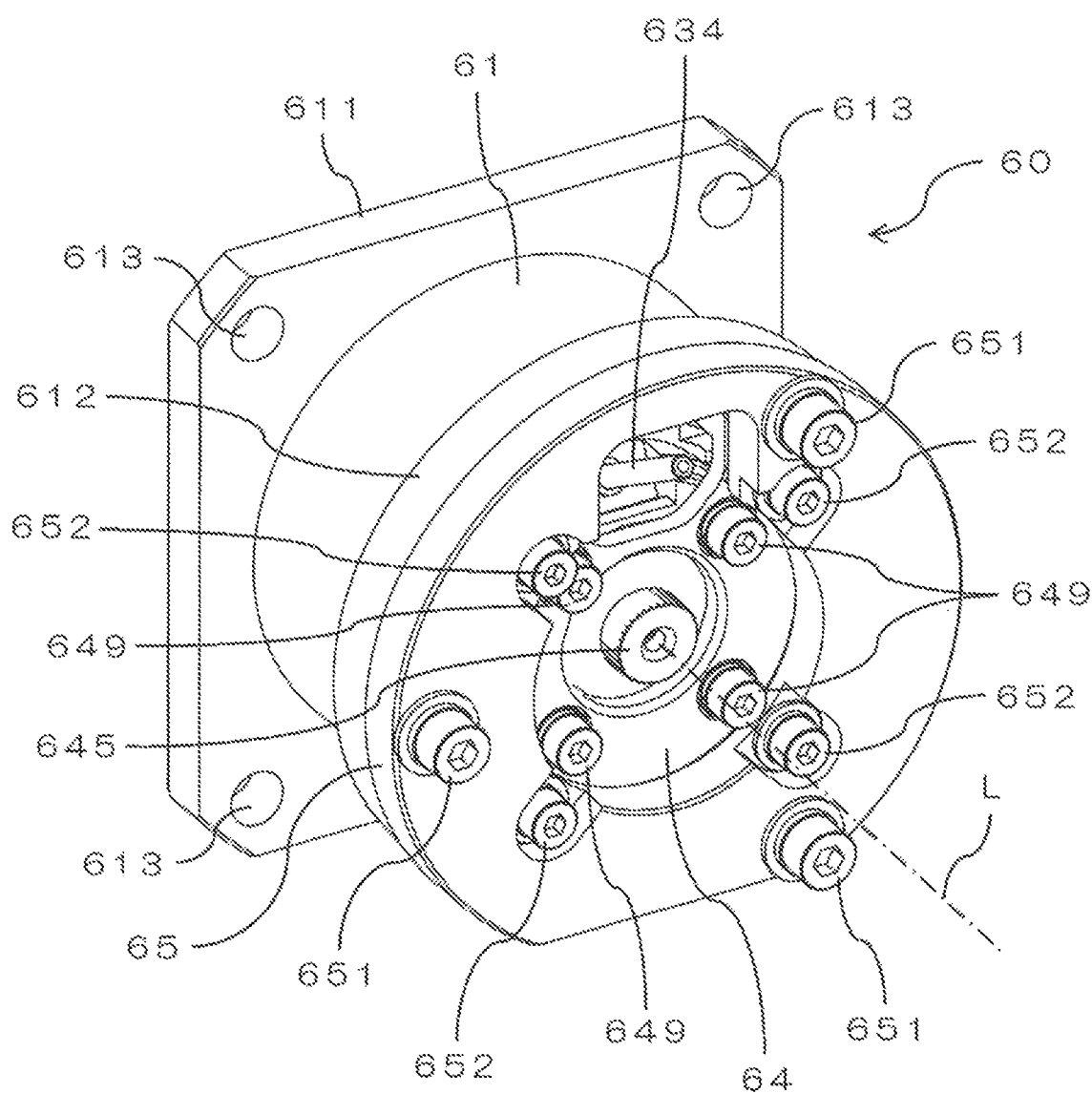
FIG. 4 is a perspective view of a fixing portion as viewed from the opposite side to the rotational shaft side.
Figure 5:
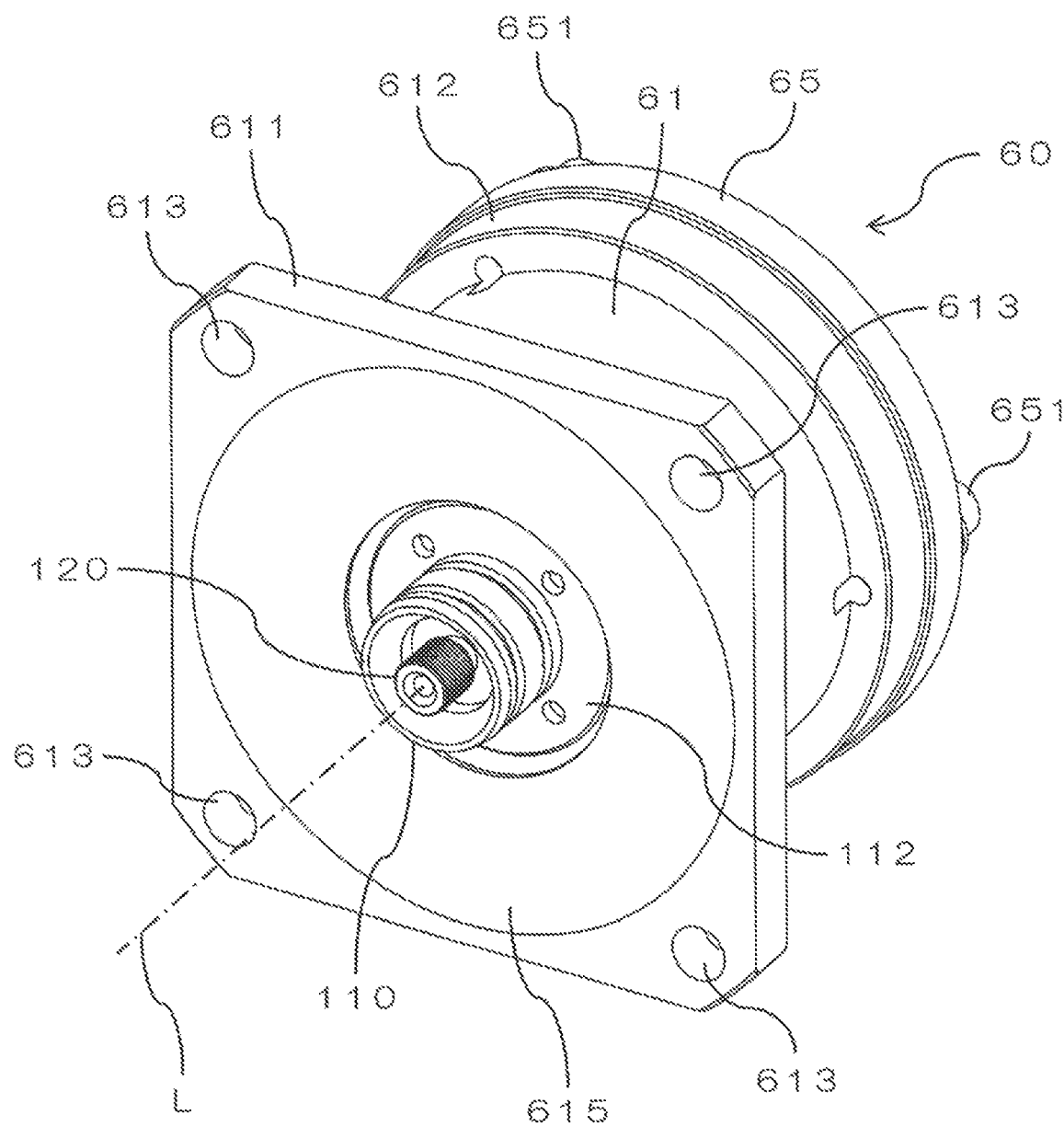
FIG. 5 is a perspective view of the fixing portion as viewed from the rotational shaft side.
Figure 6:
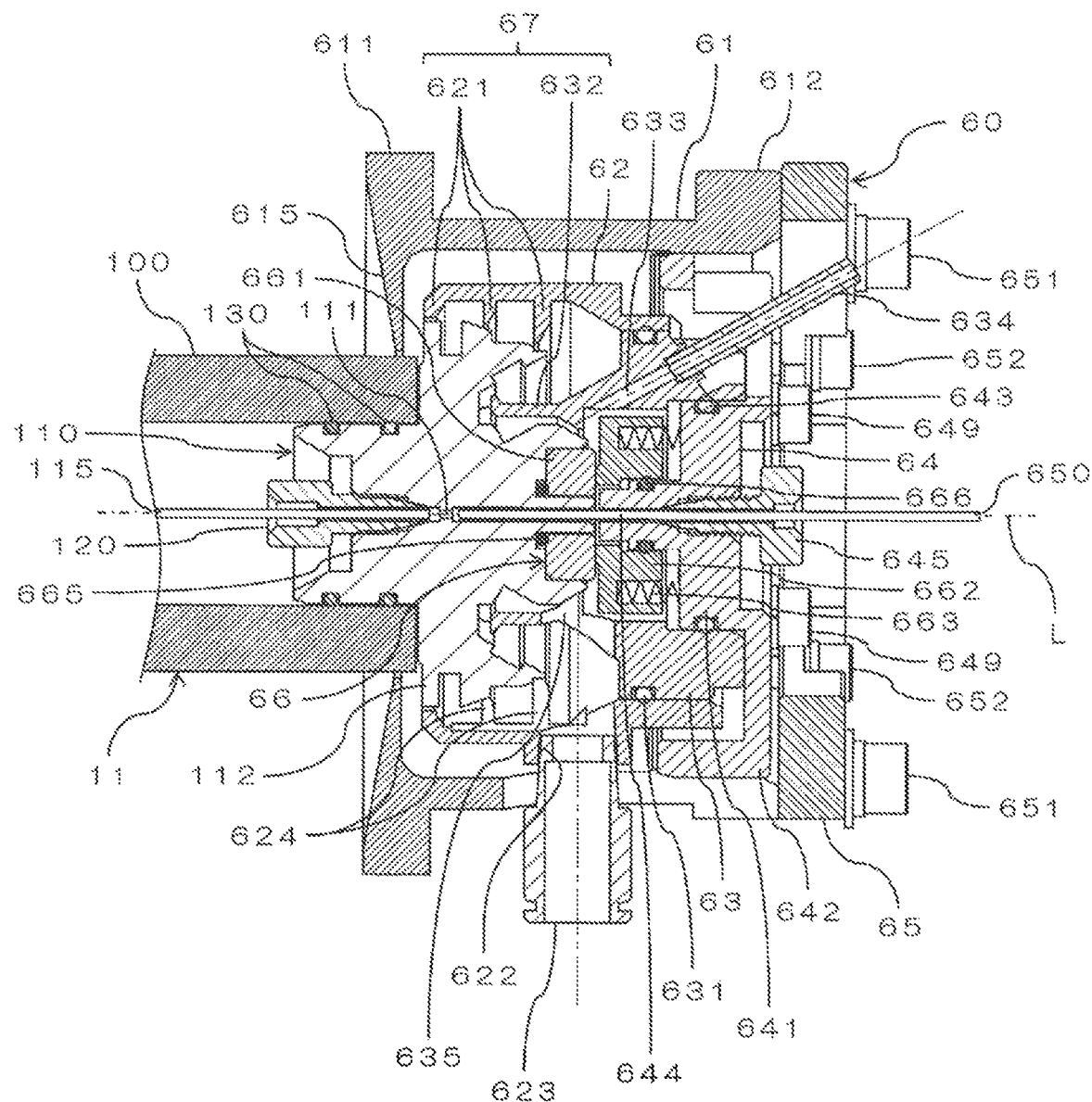
FIG. 6 is a sectional view of the rotational shaft and the fixing portion.
Figure 7:
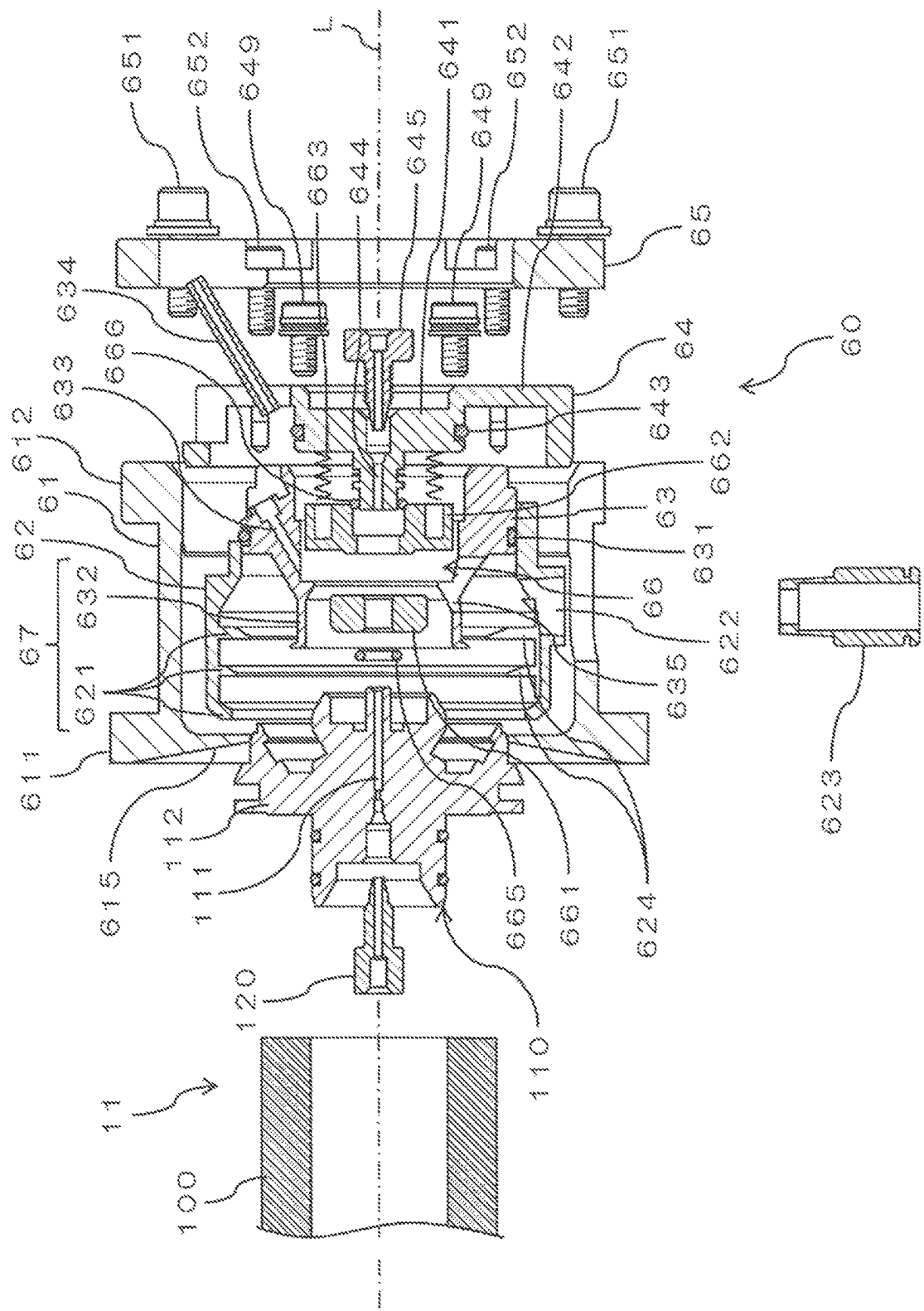
FIG. 7 is an exploded sectional view of the rotational shaft and the fixing portion.
Figure 8:
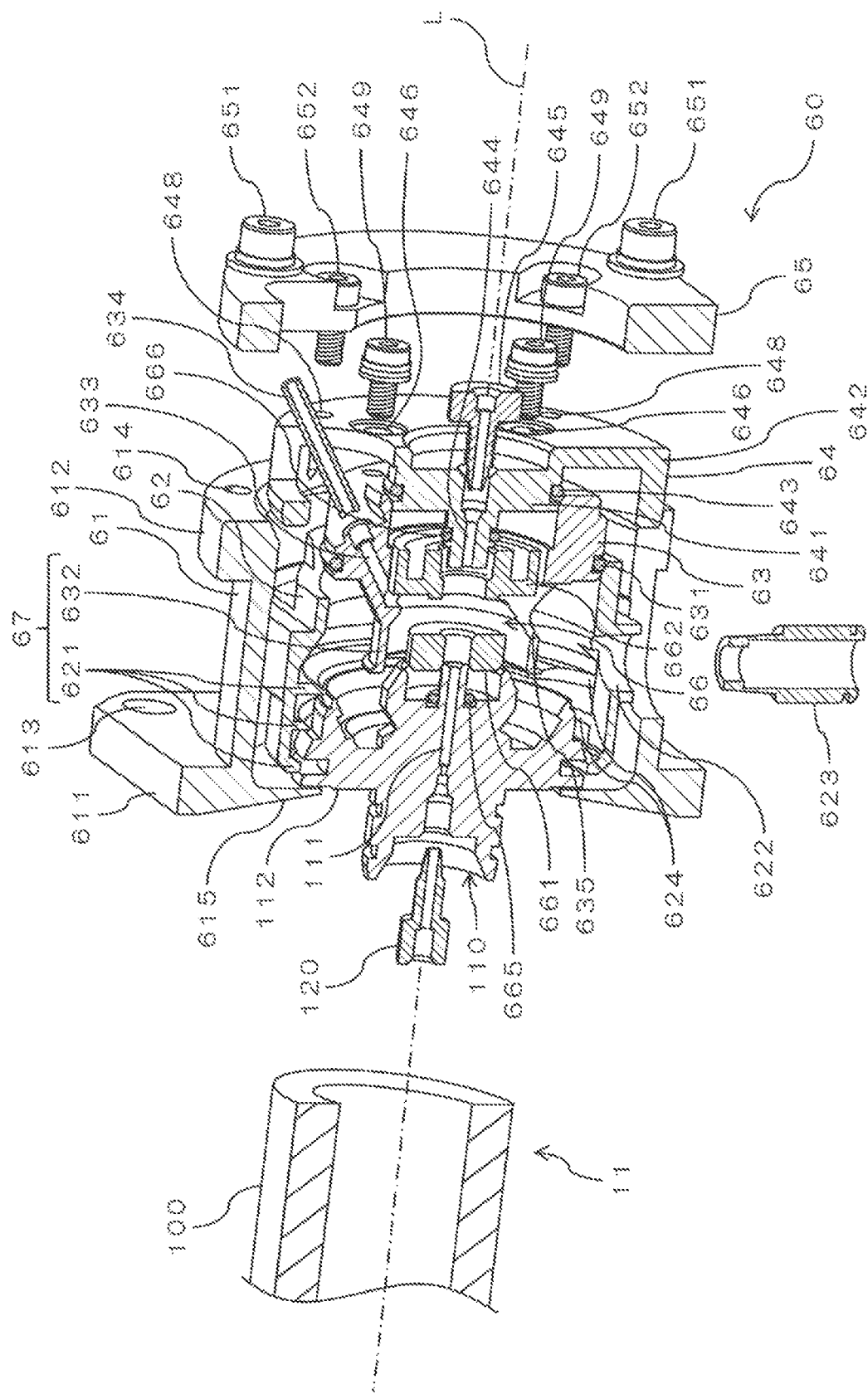
FIG. 8 is an exploded sectional perspective view of the rotational shaft and the fixing portion.

FIG. 4 is a perspective view of a fixing portion 60 as viewed from the opposite side to the rotational shaft 11 side. FIG. 5 is a perspective view of the fixing portion 60 as viewed from the rotational shaft 11 side. FIG. 6 is a sectional view of the rotational shaft 11 and the fixing portion 60. FIG. 7 is an exploded sectional view of the rotational shaft 11 and the fixing portion 60. FIG. 8 is an exploded sectional perspective view of the rotational shaft 11 and the fixing portion 60. An example of a specific configuration of the rotational shaft 11 and the fixing portion 60 will be described in detail below with reference to FIGS. 4 to 8.

The rotational shaft 11 includes a cylindrical shaft main body 100 extending along the rotational axis L, and end portion members 110 fixed to both end portions of the shaft main body 100. A part of the end portion member 110 is inserted into the shaft main body 100, and the outer peripheral surface and the inner peripheral surface of the shaft main body 100 are brought into pressure contact with each other via one or a plurality of O-rings 130 attached to the outer peripheral surface of the end portion member. In FIGS. 4 to 8, the configuration around the end portion member 110 provided at one end of the rotational shaft 11 is described, but a similar configuration is provided around the end portion member 110 provided at the other end portion of the rotational shaft 11.

A first channel 111 extending along the rotational axis L is formed in the end portion member 110. The first channel 111 penetrates the end portion member 110 along the rotational axis L. A tubular first connection member 120 is connected to an end portion of the end portion member 110 on the shaft main body 100 side. The first connection member 120 is connected to the discharge unit 13, and the liquid sample after classification discharged from the outlet 165 of the channel member 16 via the discharge unit 13 flows into the first channel 111 via the first connection member 120. At a central portion of the end portion member 110 along the rotational axis L, a flange portion 112 projecting radially outward is formed.

The fixing portion 60 is fixed to the holding plate 21 in a state of facing the end portion member 110 along the rotational axis L. An end portion of the end portion member 110 on the opposite side to the shaft main body 100 side is covered with the fixing portion 60 including the flange portion 112. As a result, as shown in FIGS. 4 and 5, the end portion member 110 and the fixing portion 60 can be handled integrally.

The fixing portion 60 is configured by assembling, for example, an outer cylinder 61, a middle cylinder 62, an inner cylinder 63, an inner member 64, and a lid member 65. The outer cylinder 61, the middle cylinder 62, the inner cylinder 63, the inner member 64, and the lid member 65 are all assembled so that the central axis is coaxial with the rotational axis L, and attached to the holding plate 21.

The outer cylinder 61 constitutes an outer peripheral surface of the fixing portion 60, and flange portions 611 and 612 projecting radially outward are formed on both end surfaces of the outer cylinder 61. A plurality of through holes 613 are formed in the flange portion 611 on the rotational shaft 11 side. The outer cylinder 61 can be fixed to the holding plate 21 by inserting fixing devices (not shown) such as bolts into the through holes 613 and attaching them to the holding plate 21. A plurality of screw holes 614 are formed in the flange portion 612 on the side opposite to the rotational shaft 11 side (see FIG. 8). The lid member 65 is fixed to these screw holes 614 by attaching fixing devices 651 such as bolts.

A flange portion 615 projecting radially inward (the rotational axis L side) is further formed on an end face of the outer cylinder 61 on the flange portion 611 side. The inner diameter of the flange portion 615 is set smaller than the outer diameter of the flange portion 112 of the end portion member 110. Thus, it is possible to prevent the end portion member 110 in the outer cylinder 61 from coming out toward the rotational shaft 11.

The outer diameter of the middle cylinder 62 is larger than the inner diameter of the flange portion 615 of the outer cylinder 61 and smaller than the inner diameter of the portion of the outer cylinder 61 other than the flange portion 615. Further, the inner diameter of the middle cylinder 62 is larger than the outer diameter of the flange portion 112 of the end portion member 110. In a state where the middle cylinder 62 is accommodated in the outer cylinder 61, the flange portion 112 and the end portion of the end portion member 110 on the side opposite to the shaft main body 100 side is accommodated in the middle cylinder 62.

A plurality of annular ribs 621 projecting radially inward are formed at a portion of the inner peripheral surface of the middle cylinder 62 facing the outer peripheral surface of the flange portion 112 of the end portion member 110, and the tips of these ribs 621 face the outer peripheral surface of the flange portion 112 closely. A through hole 622 is formed in the lower portion of the middle cylinder 62 and vertically penetrates the wall surface of the middle cylinder 62. A pipe member 623 is inserted into and fixed to the through hole 622 so as to extend vertically.

The outer diameter of the inner cylinder 63 is slightly smaller than the inner diameter of the end portion of the middle cylinder 62 on the side opposite to the rotational shaft 11 side. One or more O-rings 631 are attached to the outer peripheral surface of the inner cylinder 63, and the inner surface of the end portion of the middle cylinder 62 opposite to the rotational shaft 11 side and the outer peripheral surface of the inner cylinder 63 are in pressure contact in a liquid-tight state through the O-rings 631. As a result, the inner cylinder 63 is accommodated in the middle cylinder 62, and is arranged in line with the end portion member 110 along the rotational axis L.

A cylindrical rib 632 projecting toward the end portion member 110 is formed in the inner cylinder 63 coaxially with the rotational axis L. A portion of the end portion member 110 closer to the inner cylinder 63 than the flange portion 112 is accommodated in the rib 632. The tip of the rib 632 on the end portion member 110 side faces the flange portion 112 of the end portion member 110 in the vicinity of the flange portion.

A cooling liquid supply port 633 for supplying a cooling liquid into the inner cylinder 63 is formed at an upper portion of the inner cylinder 63. The cooling liquid supply port 633 penetrates the wall surface of the inner cylinder 63 in a direction inclined with respect to the rotational axis L, for example. A cooling liquid introduction pipe 634 is connected to the cooling liquid supply port 633, and a cooling liquid can be introduced into the cooling liquid supply port 633 from the outside via the cooling liquid introduction pipe 634. The cooling liquid may be, for example, water, but may be a liquid other than water.

The inner member 64 has a configuration in which a shaft portion 641 accommodated in the inner cylinder 63 and a flange portion 642 projecting radially outward from the shaft portion 641 are integrally formed. The outer diameter of the shaft portion 641 is slightly smaller than the inner diameter of the end portion of the inner cylinder 63 on the side opposite to the rotational shaft 11 side. One or more O-rings 643 are attached to the outer peripheral surface of the shaft portion 641, and the inner surface of the end portion of the inner cylinder 63 opposite to the rotational shaft 11 side and the outer peripheral surface of the shaft portion 641 are brought into pressure contact with each other in a liquid-tight state via the O-rings 643. As a result, the shaft portion 641 is accommodated in the inner cylinder 63 and fixed in a state facing the end portion member 110 along the rotational axis L.

A plurality of through holes 646 are formed in the flange portion 642 of the inner member 64 (see FIG. 8). The inner member 64 can be fixed to the inner cylinder 63 by inserting a fixing tool 649 such as a bolt into each of the through holes 646 and attaching it to the inner cylinder 63. A plurality of screw holes 648 are formed in the flange portion 642 of the inner member 64 (see FIG. 8). The lid member 65 is fixed to each of these screw holes 648 by attaching a fixing tool 652 such as a bolt. The lid member 65 is formed, for example, in an annular shape.

A second channel 644 extending along the rotational axis L is formed inside the shaft portion 641 of the inner member 64. The second channel 644 penetrates the shaft portion 641 along the rotational axis L. The second channel 644 is in communication with the first channel 111 of the end portion member 110, and the liquid sample flowing into the first channel 111 is guided to the second channel 644 along the rotational axis L. A tubular second connection member 645 is connected to an end portion of the shaft portion 641 on the side opposite to the end portion member 110 side. The liquid sample flowing into the second channel 644 from the first channel 111 is guided to the outside through the second connection member 645.

The first channel 111 of the end portion member 110 and the second channel 644 of the inner member 64 are connected in a liquid-tight state by a mechanical seal 66. The mechanical seal 66 includes a pair of seal rings 661 and 662 that come into contact with each other and a biasing member 663. Each of the pair of seal rings 661 and 662 is formed into an annular shape of a material having high heat resistance and high reaction resistance, such as a metal. Examples of the material for forming the pair of seal rings 661 and 662 include, but are not limited to, silicon carbide (SiC) and polyacetal.

One seal ring (first seal ring 661) is attached to the end portion member 110 of the rotational shaft 11. The other seal ring (second seal ring 662) is attached to the inner member 64 of the fixing portion 60. The biasing member 663 is attached to the inner member 64 to be provided on the fixing portion 60, and biases the second seal ring 662 toward the first seal ring 661. As a result, the first seal ring 661 and the second seal ring 662 are biased in a direction in which the seal rings come into contact with each other (In FIG. 8, the biasing member 663 is omitted.).

Figure 9:
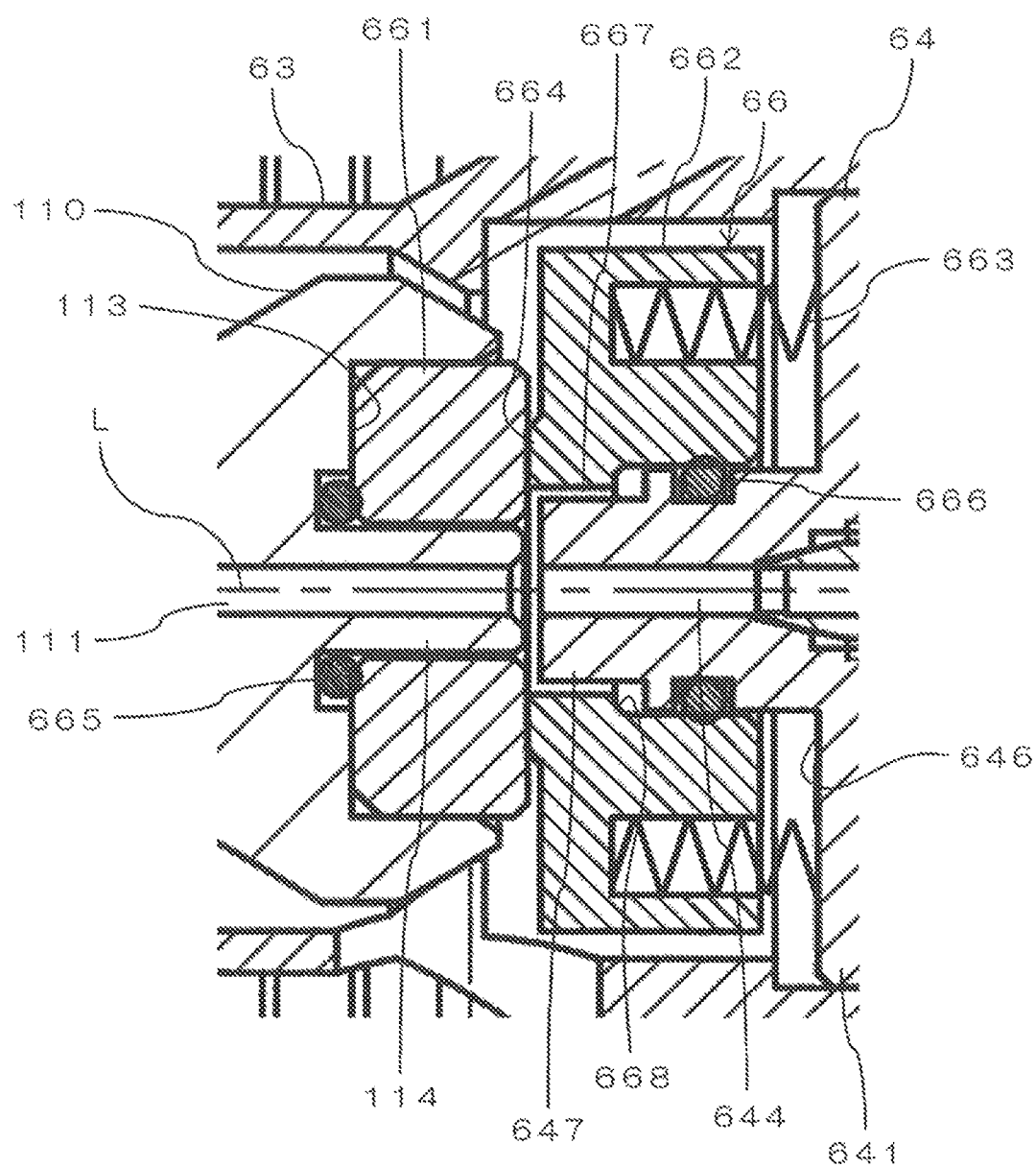
FIG. 9 is a partially enlarged sectional view showing a configuration around a mechanical seal.

FIG. 9 is a partially enlarged sectional view showing the configuration around the mechanical seal 66. As shown in FIG. 9, the first seal ring 661 and the second seal ring 662 are each disposed coaxially with the rotational axis L and are opposed to each other along the rotational axis L.

An annular projection 664 projecting toward the first seal ring 661 is formed on the surface of the second seal ring 662 facing the first seal ring 661. The contact area between the first seal ring 661 and the second seal ring 662 is minimized by the contact of the tip face of the projection 664 with the first seal ring 661. When the rotational shaft 11 rotates, the first seal ring 661 attached to the end portion member 110 of the rotational shaft 11 rotates and comes into sliding contact with the tip surface of the projection 664 of the second seal ring 662. However, the projection 664 may be formed on the first seal ring 661 so as to come into contact with the second seal ring 662.

A positioning portion (not shown) for positioning so as not to rotate about the rotational axis L with respect to the rotational shaft 11 (e.g., the end portion member 110) may be formed on the first seal ring 661. A positioning portion (not shown) for positioning so as not to rotate about the rotational axis L with respect to the fixing portion 60 (e.g., the inner cylinder 63) may be formed on the second seal ring 662. Each of the above-described positioning portions may be formed by, for example, a projection or a recess.

An annular recess 113 is formed on the end surface of the end portion member 110 on the inner member 64 side, whereby a cylindrical portion 114 extending along the rotational axis L is formed at the center of the recess 113. The inner diameter of the recess 113 substantially matches the outer diameter of the first seal ring 661, and the outer diameter of the cylindrical portion 114 substantially matches the inner diameter of the first seal ring 661.

The first seal ring 661 is accommodated in the recess 113 with the cylindrical portion 114 inserted along the rotational axis L. An O-ring 665 is provided on the bottom surface of the recess 113, and the cylindrical portion 114 is inserted into the O-ring 665 and then the cylindrical portion 114 is inserted into the first seal ring 661, so that the O-ring 665 and the first seal ring 661 face each other along the rotational axis L. As a result, the surface of the first seal ring 661 on the side opposite to the side of the second seal ring 662 is brought into pressure contact with the O-ring 665, and the space between the end portion member 110 and the first seal ring 661 is brought into a liquid-tight state.

An annular step portion 646 is formed on an end surface of the shaft portion 641 of the inner member 64 on the end portion member 110 side, so that a cylindrical portion 647 extending along the rotational axis L is formed. The outer diameter of the cylindrical portion 647 substantially matches the inner diameter of the second seal ring 662.

The second seal ring 662 is disposed with the cylindrical portion 647 inserted along the rotational axis L. An O-ring 666 is provided on the outer peripheral surface of the cylindrical portion 647, and the second seal ring 662 is attached so as to cover the radially outer side of the O-ring 666. As a result, the inner peripheral surface of the second seal ring 662 is brought into pressure contact with the O-ring 666, and the space between the shaft portion 641 of the inner member 64 and the second seal ring 662 is brought into a liquid-tight state.

The biasing member 663 is configured of, for example, an annular compression spring. The biasing member 663 is disposed on the step portion 646 with the cylindrical portion 647 of the inner member 64 inserted along the rotational axis L. After the cylindrical portion 647 is inserted into the biasing member 663, the cylindrical portion 647 is inserted into the second seal ring 662, whereby the biasing member 663 and the second seal ring 662 are facing each other along the rotational axis L. As a result, the biasing member 663 enters into a recess formed on the surface of the second seal ring 662 on the side opposite to the first seal ring 661 side, presses the second seal ring 662, and biases the second seal ring 662 toward the first seal ring 661.

When the first seal ring 661 and the second seal ring 662 are in contact with each other, a small gap is formed between the end surface of the end portion member 110 on the inner member 64 side and the end surface of the inner member 64 on the end portion member 110 side. An annular gap is formed between an end portion of the cylindrical portion 647 of the inner member 64 on the end portion member 110 side and the second seal ring 662 covering the radially outer side of the end portion. These gaps communicate with each other, and constitute a branch path 667 that branches from a connection portion between the first channel 111 formed in the end portion member 110 and the second channel 644 formed in the inner member 64.

A step surface 668 is formed on the inner peripheral surface of the second seal ring 662 so that the inner diameter of the first seal ring 661 side is smaller than the inner diameter of the biasing member 663 side. The branch path 667 extends to the vicinity of the step surface 668. As a result, a part of the liquid sample flowing from the first channel 111 formed in the end portion member 110 toward the second channel 644 formed in the inner member 64 flows into the branch path 667 and is filled up to the vicinity of the step surface 668. Since the liquid sample flowing into the branch path 667 presses the step surface 668 toward the first seal ring 661, the second seal ring 662 is biased toward the first seal ring 661 by the pressure received from the liquid sample.

Referring again to FIGS. 4 to 8, the cooling liquid supply port 633 formed in the inner cylinder 63 opens to the inside of the inner cylinder 63 above the mechanical seal 66, more specifically, above the contact portion between the first seal ring 661 and the second seal ring 662. Therefore, the cooling liquid introduced from the cooling liquid introduction pipe 634 into the cooling liquid supply port 633 is supplied to the mechanical seal 66 from above, and poured into the contact portion between the first seal ring 661 and the second seal ring 662.

As a result, the mechanical seal 66 is cooled by the cooling liquid, and the cooling liquid is discharged from the through hole 622 provided below the mechanical seal 66 in the middle cylinder 62 through the pipe member 623. That is, the through hole 622 constitutes a drain port for discharging the cooling liquid to the outside of the fixing portion 60. In this example, the through hole 622 is formed below the contact portion between the first seal ring 661 and the second seal ring 662, but it is not limited to this, and may be formed at another position in the lower portion of the middle cylinder 62.

The rib 621 of the middle cylinder 62 and the rib 632 of the inner cylinder 63 are provided above the mechanical seal 66. These ribs 621 and 632 constitute a labyrinth structure 67 for preventing cooling liquid from leaking out of the gap between the fixing portion 60 and the end portion member 110. That is, when the cooling liquid is poured from above into the first seal ring 661 and the second seal ring 662 which are in sliding contact with each other due to rotation of the rotational shaft 11, the scattered cooling liquid is blocked by the plurality of ribs 621 and 632. Thus, leakage to the outside of the fixing portion 60 can be prevented.

Openings 624 and 635 are formed at lower portions of the rib 621 of the middle cylinder 62 and the rib 632 of the inner cylinder 63, respectively. Accordingly, the liquid sample scattered from the mechanical seal 66 and received by the plurality of ribs 621 and 632 is guided downward along these ribs 621 and 632 and discharged from the through hole 622 to the outside of the fixing portion 60 via the openings 624 and 635.

In the present embodiment, as shown in FIG. 6, the liquid sample is guided to the outside through the inside of a first pipe 115 and the inside of a second pipe 650. The first pipe 115 is provided in the rotational shaft 11 (in the shaft main body 100 and in the end portion member 110) along the rotational axis L. On the other hand, the second pipe 650 is provided in the fixing portion 60 along the rotational axis L. The first pipe 115 and the second pipe 650 are formed of, for example, ETFE or PEEK, and have an outer diameter of 1.6 mm and an inner diameter of 0.8 mm.

The first pipe 115 constitutes at least a part of the first channel 111. In this example, the tip of the first pipe 115 is positioned in the middle of the end portion member 110 (vicinity of the first connection member 120). That is, the tip of the first pipe 115 is positioned on the rotational shaft 11 side (the shaft main body 100 side) with respect to the contact position of the pair of seal rings 661 and 662. The first pipe 115 is fixed to the end portion member 110 by the first connection member 120.

The second pipe 650 constitutes at least a part of the second channel 644. In this example, the second pipe 650 extends to the first channel 111 side through the second connection member 645 and the inner member 64. Specifically, the tip of the second pipe 650 faces in close proximity to the tip of the first pipe 115 in the middle of the end portion member 110 (vicinity of the first connection member 120). That is, the tip of the second pipe 650, similarly to the tip of the first pipe 115, is positioned on the rotational shaft 11 side (the shaft main body 100 side) with respect to the contact position of the pair of seal rings 661 and 662. The second pipe 650 is fixed to the inner member 64 by the second connection member 645 so as not to contact the end portion member 110.

As shown in FIG. 6, the tips of the first pipe 115 and the second pipe 650 face each other in close proximity to each other at positions shifted toward the rotational shaft 11 (the shaft main body 100 side) with respect to the contact position of the pair of seal rings 661 and 662.

A distance D from the contact position of the pair of seal rings 661 and 662 to the position where the tips of the first pipe 115 and the second pipe 650 face each other is preferably 3d or more where each of the outer diameters of the first pipe 115 and the second pipe 650 is d. In the present embodiment, since d=1.6 mm, D≥4.8 mm is preferable.

Thus, the distance D is preferably about 5 mm or more, more preferably 10 mm or more, and still more preferably 15 mm or more.

As described above, when the distance D is equal to or greater than a predetermined value, the liquid sample flows in the first pipe 115 or in the second pipe 650 (in the example of FIG. 6, in the second pipe 650) at the contact position of the pair of seal rings 661 and 662. Therefore, even when the pair of seal rings 661 and 662 are in sliding contact with each other at the contact position, it is possible to prevent the liquid sample from being stirred at the contact position. Thus, even in the case where the liquid sample after the particles are classified passes through the contact position of the pair of seal rings 661 and 662 as in the present embodiment, the classified particles can be prevented from being mixed in the contact position, so that the classification performance is improved. In addition, even when a foreign matter is generated at the contact position of the pair of seal rings 661 and 662 in sliding contact with each other, it is difficult for the foreign matter to enter the first channel 111 or the second channel 644, so that deterioration of the analysis performance can be suppressed.

In the above example, the positions at which the tips of the first pipe 115 and the second pipe 650 face each other are shifted toward the rotational shaft 11 (the first connection member 120 side) with respect to the contact position of the pair of seal rings 661 and 662, but the present invention is not limited to this configuration. The positions may be shifted toward the side opposite to the rotational shaft 11, i.e., toward the fixing portion 60 (the second connection member 645 side). Alternatively, the first pipe 115 may be omitted, and the tip of the second pipe 650 may be disposed at a position shifted with respect to the contact position of the pair of seal rings 661 and 662 toward the rotational shaft 11 side (first connection member 120 side).

5. Effects (1) In the present embodiment, as shown in FIG. 6, the first channel 111 formed in the end portion member 110 of the rotational shaft 11 and the second channel 644 formed in the inner member 64 of the fixing portion 60 are fluid-tightly connected via the mechanical seal 66. That is, of the pair of seal rings 661 and 662 provided in the mechanical seal 66, the first seal ring 661 is attached to the end portion member 110 of the rotational shaft 11, and the second seal ring 662 is attached to the inner member 64 of the fixing portion 60, so that the pair of seal rings 661 and 662 come into contact with each other by the biasing force of the biasing member 663. When the rotational shaft 11 is rotated, the pair of seal rings 661 and 662 are brought into sliding contact with each other while being in contact with each other, so that the first channel 111 and the second channel 644 are maintained in a liquid-tight state.

In such a configuration using the mechanical seal 66, even when the rotational shaft 11 is rotated at a high speed, heat generation is less likely to occur as compared with a configuration in which the oil seal is brought into sliding contact with the outer peripheral surface of the rotational shaft 11. In addition, even when the liquid sample is fed to the first channel 111 and the second channel 644 at a high pressure, the possibility of leakage of the liquid sample due to deformation or generation of heat is lower than in the case of an oil seal. Therefore, since the rotational shaft 11 can be rotated at a high speed and the liquid sample can be fed at a high pressure, the analysis performance can be improved and the analysis time can be shortened.

Further, since the pair of seal rings 661 and 662 constituting the mechanical seal 66 are formed of a material having high heat resistance and reactivity resistance such as a metal, it is possible to prevent each of the seal rings 661 and 662 from melting by being used in a high-temperature environment and to prevent each of the seal rings 661 and 662 from being affected by components of a liquid sample. Therefore, the liquid sample can be prevented from leaking under the influence of the temperature environment or the components of the liquid sample.

(2) In the present embodiment, as shown in FIG. 6, the mechanical seal 66 is cooled by the cooling liquid supplied from the cooling liquid supply port 633 provided in the inner cylinder 63 of the fixing portion 60. By forming the cooling liquid supply port 633 in the fixing portion 60 instead of the rotational shaft 11, it is possible to prevent the pipe for supplying the cooling liquid to the cooling liquid supply port 633 from being entangled with the rotation of the rotational shaft 11.

(3) In the present embodiment, as shown in FIG. 6, the cooling liquid supplied from the cooling liquid supply port 633 is guided by gravity to the mechanical seal 66 provided below the cooling liquid supply port 633, and the mechanical seal 66 is cooled. The cooling liquid after cooling the mechanical seal 66 is guided by gravity to the through hole 622 formed below the mechanical seal 66 in the middle cylinder 62 of the fixing portion 60, and is discharged from the through hole 622 to the outside of the fixing portion 60. Thus, the mechanical seal 66 can be well cooled by simply supplying the cooling liquid to a simple channel utilizing gravity.

(4) In the present embodiment, as shown in FIG. 6, leakage of the cooling liquid from the gap between the fixing portion 60 and the rotational shaft 11 to the outside can be prevented by the labyrinth structure 67, and the cooling liquid can be well discharged from the through hole 622. Thus, it is possible to prevent the cooling liquid from scattering to the outside of the device.

(5) In the present embodiment, as shown in FIG. 9, the pressure received from the liquid sample flowing into the branch path 667 causes the pair of seal rings 661 and 662 to come into contact with each other with a larger biasing force, so that the first channel 111 and the second channel 644 are maintained in a higher liquid-tight state.

6. Variations

In the embodiment described above, the biasing member 663 biases the second seal ring 662 toward the first seal ring 661. However, the present invention is not limited to such a configuration, and the biasing member 663 may be configured to bias the first seal ring 661 toward the second seal ring 662. In this case, the biasing member 663 is not limited to the configuration provided to the fixing portion 60, and may be a configuration provided to the rotational shaft 11 (the end portion member 110).

Although the configuration in which the branch path 667 is provided in the inner member 64 has been described, the present invention is not limited thereto, and the branch path 667 may be provided in the end portion member 110. In this case, the first seal ring 661 may be biased toward the second seal ring 662 by the pressure received from the liquid sample flowing into the branch path 667.

The rotational shaft 11 is not limited to have a configuration including the shaft main body 100 and the end portion member 110, and may have a configuration in which the shaft main body 100 and the end portion member 110 are integrally formed or a configuration including other members. Similarly, the fixing portion 60 is not limited to the configuration including the outer cylinder 61, the middle cylinder 62, the inner cylinder 63, the inner member 64, and the lid member 65, and at least a part of them may be integrally formed or may include other members.

The first connection member 120 is not limited to the configuration connected to the discharge unit 13 and may be connected to the introduction unit 12. In this case, the liquid sample before classification flowing from the second channel 644 to the first channel 111 may flow into the inlet 164 of the channel member 16 from the first connection member 120 via the introduction unit 12.

DESCRIPTION OF REFERENCE SIGNS 1 centrifugal field-flow fractionation device
60 fixing portion
61 outer cylinder
62 middle cylinder
63 inner cylinder
64 inner member
65 lid member
66 mechanical seal
67 labyrinth structure
100 shaft main body
110 end portion member
111 first channel
112 flange portion
113 recess
114 cylindrical portion
115 first pipe
120 first connection member
611, 612 flange portion
613 through hole
615 flange portion
621 rib
622 through hole
623 pipe member
624 opening
632 rib
633 cooling liquid supply port
634 cooling liquid introduction pipe
635 opening
641 shaft portion
642 flange portion
644 second channel
645 second connection member
646 through hole
646 step portion
647 cylindrical portion
650 second pipe
661 first seal ring
662 second seal ring
663 biasing member
664 projection
667 branch path
668 step surface

The invention claimed is:

1. A centrifugal field-flow fractionation device comprising: an annular rotor that rotates about a rotational axis; a channel member that is provided in the rotor and has therein a channel for a liquid sample extending in an arc shape around the rotational axis, an inlet for the liquid sample to the channel, and an outlet for the liquid sample from the channel; a rotational shaft that rotates with the rotor and has a first channel in communication with the inlet or the outlet along the rotational axis; a fixing portion that is fixed in a state of facing the rotational shaft along the rotational axis and has a second channel in communication with the first channel along the rotational axis; and a mechanical seal that has a pair of seal rings in contact with each other and a biasing member, one of the seal rings being attached to the rotational shaft, and another of the seal rings being attached to the fixing portion, the biasing member biasing the pair of seal rings in a direction in which the pair of seal rings come into contact with each other, wherein a cooling liquid supply port for supplying a cooling liquid for cooling the mechanical seal is formed in the fixing portion, the cooling liquid supply port supplies the cooling liquid to the mechanical seal from above, and a drain port for discharging the cooling liquid to an outside of the fixing portion is formed below the mechanical seal in the fixing portion, and wherein by providing a plurality of ribs above the mechanical seal in the fixing portion, a labyrinth structure is formed to prevent leakage of the cooling liquid from a gap between the fixing portion and the rotational shaft.

2. A centrifugal field-flow fractionation device comprising: an annular rotor that rotates about a rotational axis; a channel member that is provided in the rotor and has therein a channel for a liquid sample extending in an arc shape around the rotational axis, an inlet for the liquid sample to the channel, and an outlet for the liquid sample from the channel; a rotational shaft that rotates with the rotor and has a first channel in communication with the inlet or the outlet along the rotational axis; a fixing portion that is fixed in a state of facing the rotational shaft along the rotational axis and has a second channel in communication with the first channel along the rotational axis; and a mechanical seal that has a pair of seal rings in contact with each other and a biasing member, one of the seal rings being attached to the rotational shaft, and another of the seal rings being attached to the fixing portion, the biasing member biasing the pair of seal rings in a direction in which the pair of seal rings come into contact with each other wherein at least one of the rotational shaft and the fixing portion is formed with a branch path branched from a connection portion between the first channel and the second channel, and the pair of seal rings are biased in a direction in which the pair of seal rings come into contact with each other by a pressure received from a liquid sample flowing into the branch path.

3. A centrifugal field-flow fractionation device comprising: an annular rotor that rotates about a rotational axis; a channel member that is provided in the rotor and has therein a channel for a liquid sample extending in an arc shape around the rotational axis, an inlet for the liquid sample to the channel, and an outlet for the liquid sample from the channel; a rotational shaft that rotates with the rotor and has a first channel in communication with the inlet or the outlet along the rotational axis; a fixing portion that is fixed in a state of facing the rotational shaft along the rotational axis and has a second channel in communication with the first channel along the rotational axis; a mechanical seal that has a pair of seal rings in contact with each other and a biasing member, one of the seal rings being attached to the rotational shaft, and another of the seal rings being attached to the fixing portion, the biasing member biasing the pair of seal rings in a direction in which the pair of seal rings come into contact with each other a first pipe that is provided in the rotational shaft along the rotational axis and constitutes at least a part of the first channel; and a second pipe that is provided in the fixing portion along the rotational axis and constitutes at least a part of the second channel, wherein fops of the first pipe and the second pipe face each other in close proximity to each other at a position shifted toward the rotational shaft or the fixing portion with respect to a contact position of the pair of sea rings.

4. The centrifugal field-flow fractionation device according to claim 1, further comprising:
- a first pipe that is provided in the rotational shaft along the rotational axis and constitutes at least a part of the first channel, and
- a second pipe that is provided in the fixing portion along the rotational axis and constitutes at least a part of the second channel,
- wherein tips of the first pipe and the second pipe face each other in close proximity to each other at a position shifted toward the fixing portion with respect to a contact position of the pair of seal rings.

5. The centrifugal field-flow fractionation device according to claim 1, further comprising:
- a pipe that is provided in the fixing portion along the rotational axis and constitutes at least a part of the second channel,
- wherein a tip end of the pipe is disposed at a position shifted toward the rotational shaft with respect to a contact position of the pair of seal rings.

* * * * *